United States Patent [19]

Pilsan

[11] Patent Number: 5,782,680
[45] Date of Patent: Jul. 21, 1998

[54] BURNISHING HEAD FOR POLISHING SURFACES OF CARRIERS OF MAGNETIC MEDIA

[75] Inventor: Horatiu O. Pilsan, Dornbirn, Austria

[73] Assignee: Aijohn Establishment, Vaduz, Liechtenstein

[21] Appl. No.: 748,399

[22] Filed: Nov. 13, 1996

[51] Int. Cl.[6] ........................ B24B 5/00
[52] U.S. Cl. ............... 451/317; 451/63; 451/318; 451/901
[58] Field of Search ............... 451/317, 63, 318, 451/901

[56] References Cited

U.S. PATENT DOCUMENTS

| | | | |
|---|---|---|---|
| 3,486,274 | 12/1969 | David | 451/63 |
| 3,943,666 | 3/1976 | Dion et al. | 451/6 |
| 4,241,368 | 12/1980 | Tadokoro et al. | 360/128 |
| 4,430,782 | 2/1984 | Bornhorst et al. | 29/90 R |
| 4,845,816 | 7/1989 | Nanis | 451/63 |
| 5,063,712 | 11/1991 | Hamilton et al. | 451/317 |

*Primary Examiner*—Robert A. Rose
*Assistant Examiner*—George Nguyen
*Attorney, Agent, or Firm*—Oliff & Berridge, PLC

[57] ABSTRACT

A burnishing head, which is used to polish the surface of carriers that hold magnetic media (e.g., disks for computer hard drives), includes a slider that is mounted on a suspension. The slider includes at least four protrusions that protrude toward the surface to be polished. The protrusions are arranged symmetrically relative to the center of the slider. The sum of the surface areas of the protrusions is no more than approximately 20% of the total surface area of the slider that faces the surface to be polished. Preferably the sum of the surface areas of the protrusions is no more than 10%, even more preferably, no more than 7%, of the total surface area of the slider that faces the surface to be polished.

18 Claims, 7 Drawing Sheets

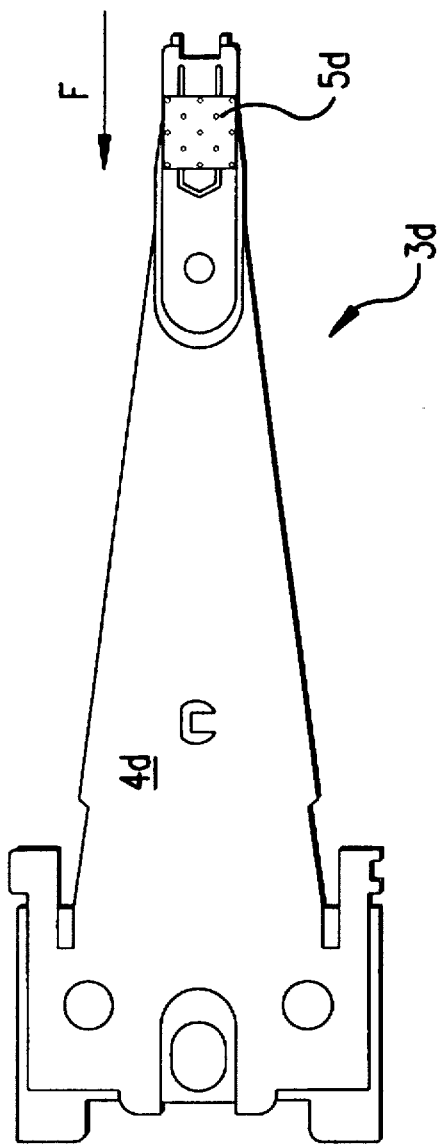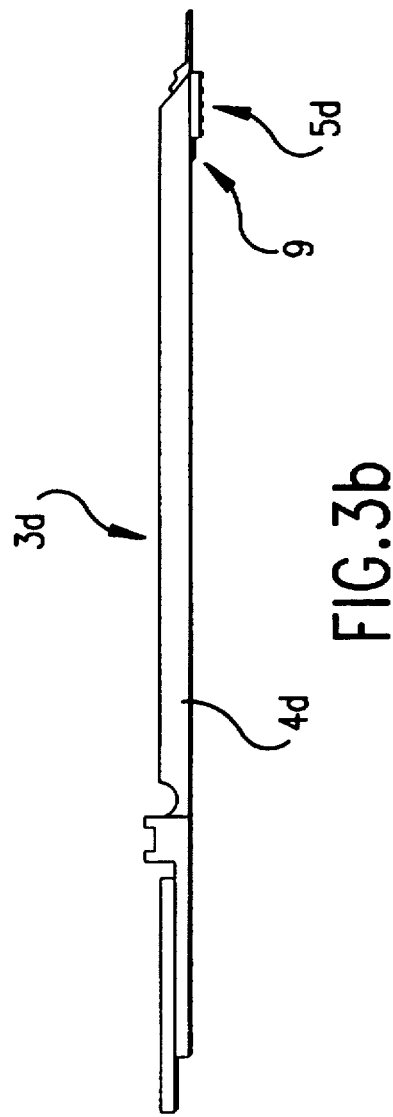

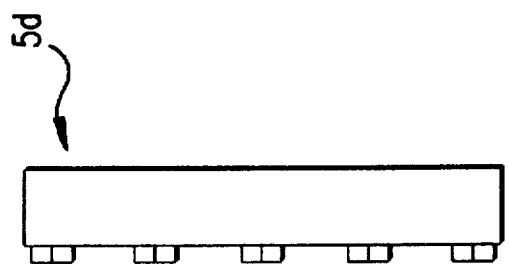
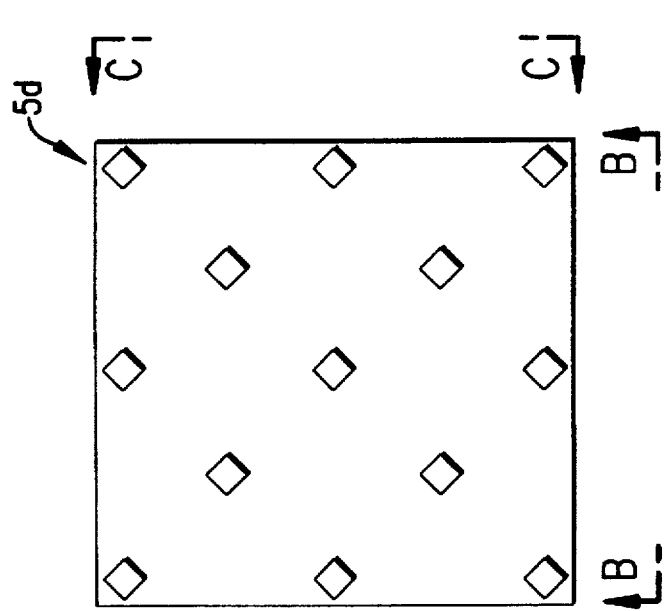 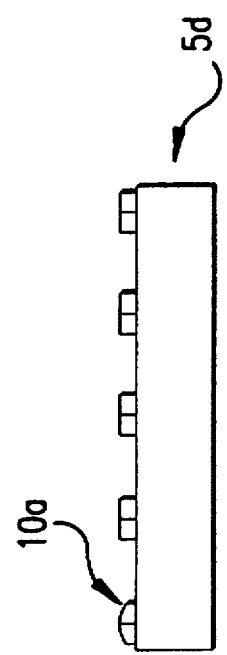

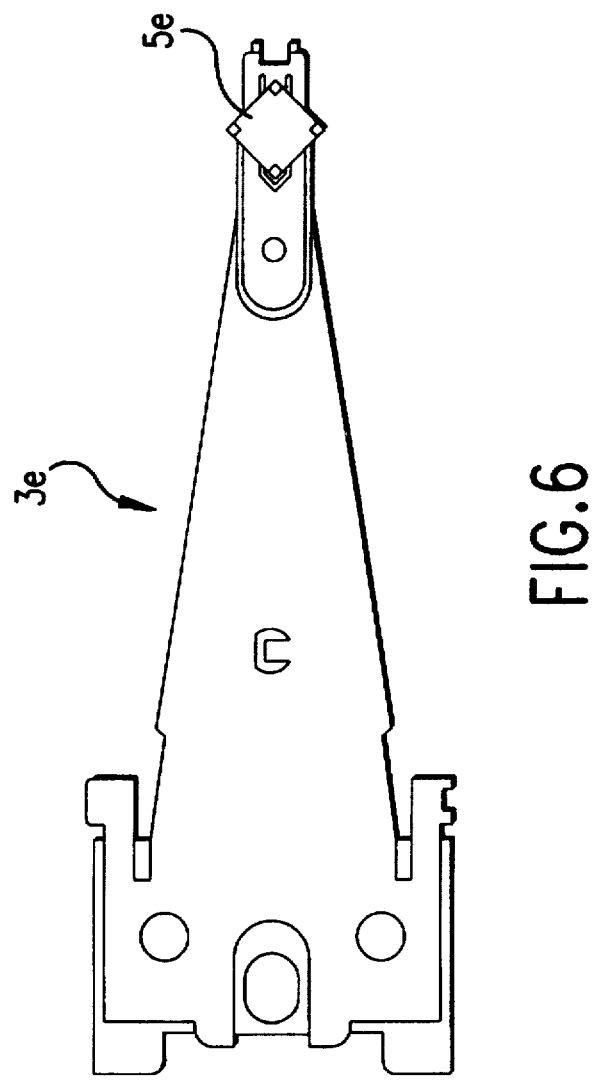

BURNISHING HEAD FOR POLISHING SURFACES OF CARRIERS OF MAGNETIC MEDIA

BACKGROUND OF THE INVENTION

1. Field of the Invention

The invention relates to a device for polishing surfaces of carriers of magnetic media as used in computer hard disk drives, also called burnishing heads.

2. Description of Related Art

For the sake of simplicity of the description, in the following a "carrier of magnetic media (as used in computer hard disk drives)" is abbreviated to "carrier".

Such carriers consist of metal disks, particularly aluminum disks, which have been ground with high precision and onto which magnetic films of 0.1 to 1 µm thickness have been deposited. The need for higher and higher storage capacity is met by increasing the surface density through the use of thin film surfaces, produced by evaporating metal films or sputtering metal atoms under vacuum.

The rapid development in computer technology has resulted in the hard disk drives having within just ten years (1984–1994)—for example for the 5.25 inch technology— an increase in capacity from 150 MByte to 10,000 MByte, an increase from the track density of 1,000 tpi (tracks per inch) to 4,000 tpi and an increase in the recording density from 25,000 bpi (bit per inch) to 100,000 bpi. The increase of the track and recording density gives rise to a continuous reduction in the mass of the read-write heads with a simultaneous decrease in their dimensions, making for a smaller flying height of the read-write heads over the hard disk surface. Nowadays, flying heights of 0.2 µm and less can be realized with a relative speed of hard disk: read-write head of 100 to 200 km/h. Accordingly high precision hard disk surfaces; unevenness of the hard disk surface would considerably impede the read-write procedure. (As a comparison: the size of a dust particle is approximately 6 µm).

The demands on the evenness of the hard disk surface are forever increasing. Uneven places are, however, the inevitable consequence of the manufacturing process of the magnetic film, be it during coating, in which a metal film is deposited, or during evaporation of metal films under vacuum or during sputtering, i.e. the sputtering of metal atoms under vacuum. Contamination, such as carbon particles, can arise in the magnetic film and/or adhere to it, and would consequently detrimentally affect the quality of the read-write procedure for low flying read-write heads.

Before the carriers are used, they are therefore polished using a so-called burnishing head, in order thus to remove any last remaining unevenness.

The demands on the effectiveness of burnishing heads is directly linked with the increased demands on the ever lower flying heights of the read-write heads and thus on an ever better surface quality, i.e. on the evenness of the hard disk surface. Burnishing heads must therefore be guided at least at the same flying height over the carrier surface as the read-write heads, preferably though at an even lower flying height. The polishing effect should arrive only from the air cushion between the gliding surface of the burnishing head and of the carrier surface. In any case, aggressive contact with sharp-edged parts of the slider damaging the magnetic film should be avoided.

Known burnishing heads ("Waffle" heads) have sliders which have waffle-like structures. The edges of the waffle structure remove any unevenness. Such burnishing heads are effective for higher flying heights of 250 to 500 nm. However, the flying characteristic of such a head is not satisfactory in the case of the required, ever lower flying heights of read-write heads, which in turn set the minimum demands on the required flying heights for the burnishing heads. Since the linear speed of the carrier increases with increasing radii, different flying heights and different pitches of the slider of such a burnishing head result. As a consequence, the burnishing head wears out on one side of the lower flying side, where all impacts arising from the unevenness occur. At this point, the head wears out faster and is thus less effective. Furthermore, the knocked-off and/or rubbed-off particles arising during the polishing process can settle in the channels provided between the waffle cushions. Thus, a counter-productive effect results upon re-using such a burnishing head for polishing further carriers; i.e. the abrasion particles can be deposited onto the new carriers, the quality of their surfaces hence being impaired instead of being improved. The geometry of the known waffle burnishing heads with their diamond-shaped waffle cushions and the narrow channels lying in between makes it impossible to use one and the same burnishing head for transversal and radial suspension systems. In this case, the burnishing head has to be positioned with a 90° turn on the suspension.

SUMMARY OF THE INVENTION

In contrast, the invention has set itself the task of providing a burnishing head, whose flying characteristic distinguishes itself—independent of its flying speed—by a mostly constant, extremely low flying height, whereby the gliding surfaces of the sliders are kept almost parallel with respect to the carrier surface. This is achieved by providing the burnishing head with a slider having at least four protrusions arranged symmetrically relative to the center of the slider, the sum of the surface areas of the protrusions being no more than approximately 20% of the total surface area of the slider that faces the surface being polished. Preferably, the sum of the surface areas of the protrusions is no more than 10%, even more preferably, no more than 7% of the total surface area of the slider.

The surface of the slider that faces the surface to be polished can have a square, rectangular or circular shape, for example.

The surfaces of the protrusions that face the surface to be polished can have a square shape, with the diagonals (i.e., the corners) of the squares oriented to face in the flying direction of the burnishing head relative to the surface being polished.

The protrusions preferably are offset relative to each other so that recesses located between the protrusions form channel-like intermediary spaces that extend at an angle of approximately 45° to the flying direction of the burnishing head.

The protrusions also can have rounded edges.

By keeping the sum of the surfaces of the protrusions orientated towards the carrier surface as small as possible, the flying speed can be increased and the flying height reduced.

The allocation of at least four protrusions, each located at the border zone of the slider, each at an equal distance from the fixation point of the burnishing head and placed central-symmetrically results in the best possible uniform distribution of the air pressure on these protrusions and consequently a reduction of the trend for a pitch. If need be, two of these protrusions are located one behind the other parallel to the flying direction.

This means that such a head according to the invention can be applied for various suspensions; i.e. it can be used both for transversal as well as for radial suspensions.

If the edges of the protrusions are rounded, the burnishing head is better suited to the carrier surface. Different heights of the protrusions, which cannot be excluded based on the manufacturing tolerances, are counterbalanced by the high pressure; a dynamic stable system is quickly achieved. Because the protrusions have rounded edges, any slightly projecting protrusions are polished away via the impacts arising from the unevenness and adjusted to a uniform plane—without having an aggressive effect on the surface of the carrier. Disturbing resonance effects, perhaps arising from different simultaneous flying planes, are eliminated in this way—even if they should arise for a short period at the beginning of use.

Due to the low sum of the surface areas of the protrusions in comparison to the total surface area of the gliding surface, the recesses between the protrusions are so large that abrasion particles do not remain clinging thereto. To this end—particularly if several protrusions are planned—these recesses are located each at an angle of approx. 45° to the flying direction.

BRIEF DESCRIPTION OF THE DRAWINGS

The invention will be described in conjunction with the following drawings in which like reference numerals designate like elements and wherein:

FIG. 2b is a bottom view of the slider of a burnishing head according to FIG. 2a;

FIG. 3a is a bottom view of a burnishing head according to the invention;

FIG. 3b is a side view according to FIG. 3a;

FIG. 4a is a bottom view of the slider of a burnishing head according to the invention;

FIGS. 4b and 4c are side views of the slider of FIG. 4a along lines B—B and C—C, respectively.

FIG. 6 shows a bottom view of a burnishing head with a slider according to FIG. 5b.

DESCRIPTION OF PREFERRED EMBODIMENTS

Figure 1:
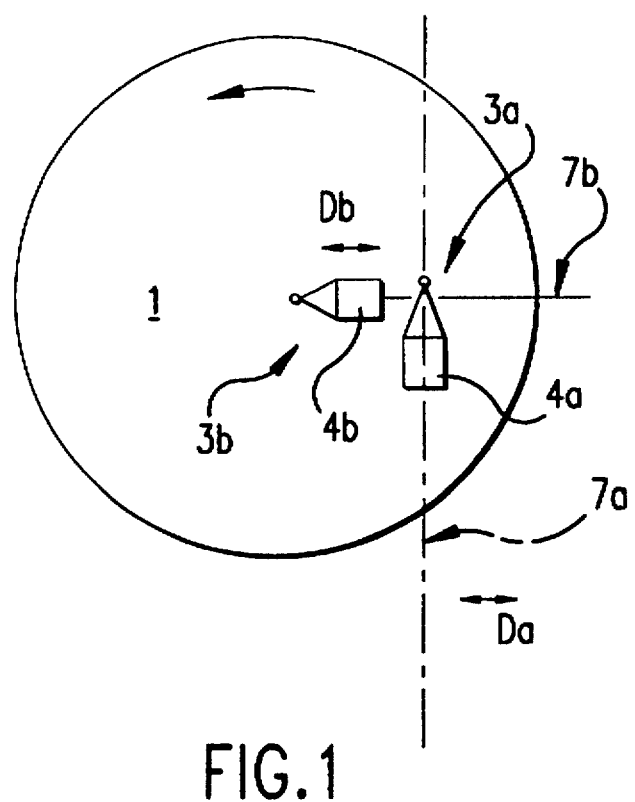
FIG. 1 is schematic construction of a carrier with transversal and radial suspension of burnishing heads.

FIG. 1 shows a schematic construction of the principle situation for a carrier 1 and possible allocation for burnishing heads 3a and 3b. The carrier 1, which—as shortly described above—is a metal, particularly an aluminum plate carrying the magnetized layer, turns away during testing in the direction of the arrow beneath the burnishing heads 3a and 3b. The slider of a burnishing head 3a, attached to an arm 7a on a suspension 4a, is moved radially to the carrier 1 according to the double arrow Da. A vertical suspension 4b is provided for another option for allocating a burnishing head 3b on an arm 7b. The movement of this burnishing head takes place in the direction of the double arrow Db.

The burnishing head 3a or 3b, respectively, "fly" at a determined distance above the carrier 1, essentially according to the read-write head during the read-write procedure. However, the burnishing head should fly as low as possible, perhaps in pseudo contact, over the carrier surface.

Figure 2A:
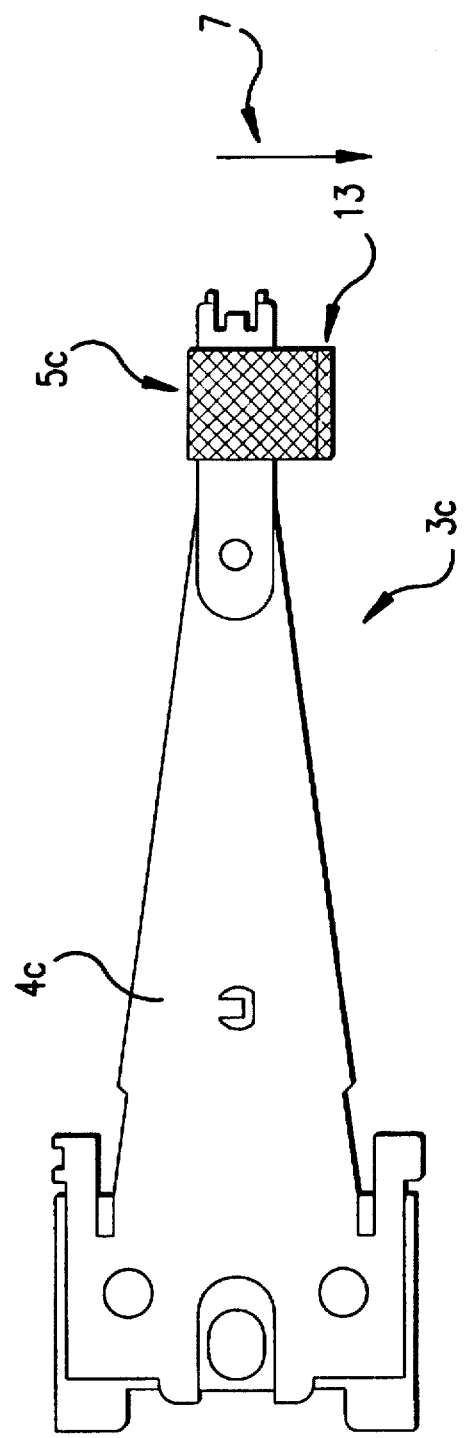
FIG. 2a is a bottom view of a burnishing head according to the state-of-the-art.
Figure 2B:
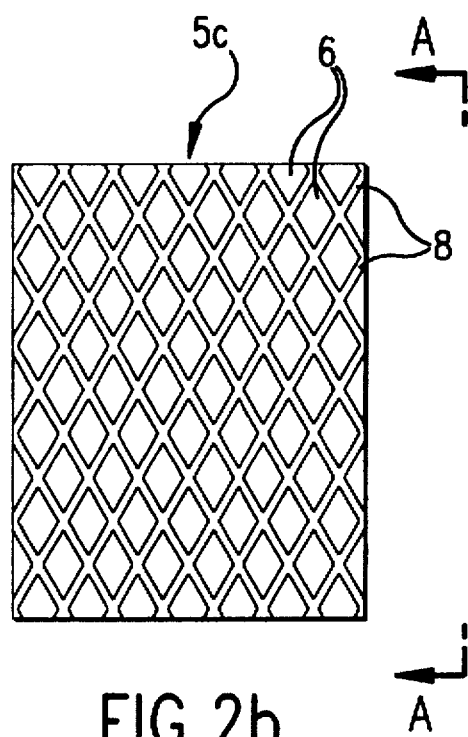
Figure 2C:
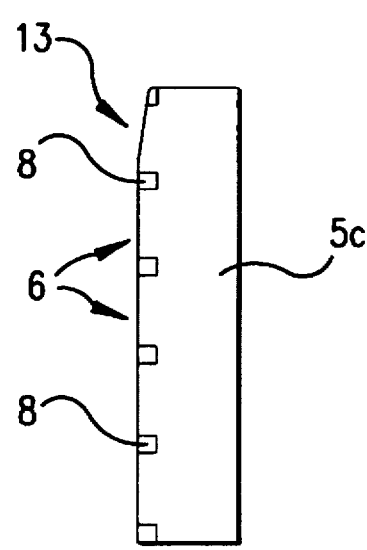
FIG. 2c corresponds to view A—A of FIG. 2b.

FIG. 2a shows a so-called burnishing head 3c with a slider 5c located on the suspension 4c. The dimensions of this slider 5c are approx. 0.115×0.085 inches with a thickness of aprox. 0.034 inches. The burnishing head 3c presented in FIGS. 2a and also the relevant slider 5c presented in FIGS. 2b and 2c is a so-called "waffle" head, whose diamond-shaped surfaces 6 give rise to the polishing effect. Narrow channels 8 are diagonally located between these surfaces 6. A ramp 13, located at the front of the slider 5c with respect to the flying direction (arrow F) of the burnishing head should prevent detrimental aggressive contact of the head with the disk. Based on this ramp 13, the slider 5c—particularly with high flying speeds—will tend to incline. The rear part of the slider will thus be pressed towards the surface of the carrier, at low flying heights will collide with uneven places or contaminations and will quickly wear out and become "blunt". Abrasion particles can cling in the narrow channels 8, also in the case of higher flying heights, resulting in a deteriorating effectiveness of the burnishing head 3c.

The burnishing head 3c presented in FIG. 2a is suspended radially, according to the burnishing head 3b of FIG. 1. For a radial suspension, the slider 5c of this head would have to be positioned with a 90° turn.

In contrast, FIGS. 3a and 3b show a burnishing head 3d according to the invention with its slider 5d on the suspension 4d, which in this case is located tangentially according to the burnishing head 3a of FIG. 1. The slider 5d, whose surface area is smaller than that presented in FIG. 2a and whose dimensions are approx. 0.09×0.09 inches with a thickness of approx. 0.03 inches, is located on the suspension 4d via a spring 9. When the burnishing head moves over the carrier surface (in fact the carrier turns away (i.e. rotates) beneath the head), then the slider 5d is pushed up somewhat against the spring force by the air pressure, and the slider assumes an almost parallel flying plane with respect to the carrier surface.

This is supported by the central-symmetrical construction of the protrusions 10, resulting in the air pressure effective on the gliding surfaces becoming constant and consequently stabilization of the flying plane even in the case of high speeds. Since the sum of the surface areas of the protrusions 10 is kept low in comparison with the surface areas of the slider 5d facing the carrier surface, this burnishing head can fly at high speeds with constant low flying heights.

Between the approximately square-shaped protrusions 10, there are wide, backwardly-positioned intermediary spaces. Abrasion particles fly through these intermediary spaces without clinging to them. The layout of the protrusions with the corners of their square shape in the flying direction makes for few susceptible surfaces—practically all abrasion particles pass by the protrusions.

The burnishing head with its slider 5d in its square-shaped form and the central-symmetrical layout of the protrusions 10 and without a sloped ramp can—without the necessity of being turned around—also be used for a radial suspension.

The edges of the protrusions 10 are—as exaggeratedly presented based on a protrusion 10a in FIG. 4b—rounded in order that the head—as described above—can quckly adjust to a flying plane, thus improving the flying characteristic.

Figure 5A:
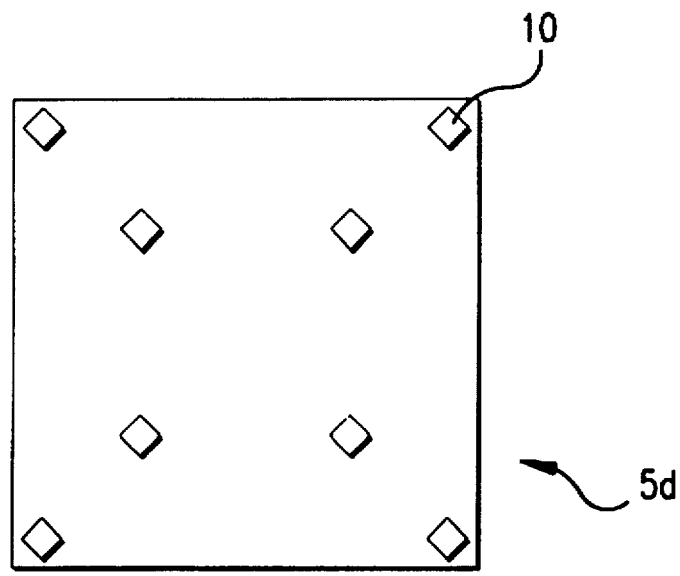
FIGS. 5a and 5b are bottom views of sliders of two further burnishing heads according to the invention.
Figure 5B:
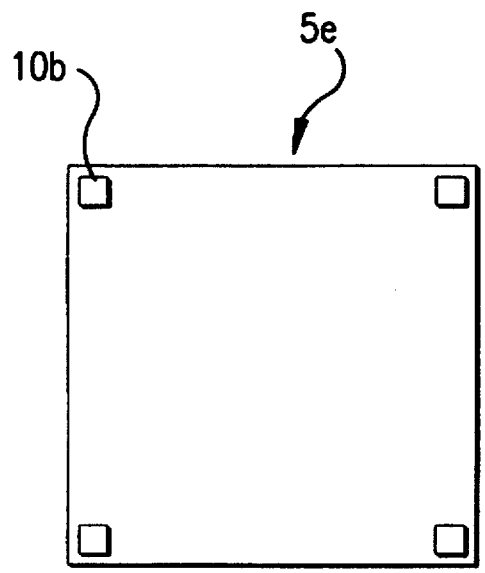

FIGS. 5a and 5b show two further sliders 5e and 5d, whereby the slider 5e of FIG. 5a has 8 protrusions 10, and whereby the slider 5d of FIG. 5b has four protrusions located at the corner points of the slider. Based on the edges of these four protrusions 10b being parallel, the allocation of the slider 5e on the burnishing head 3e as presented in FIG. 6 is to be preferred in order to minimize abrasion effects as described above. This layout is also suitable both for radial and for tangential suspensions.

Of course, the presented example is not limiting for the construction of burnishing heads. The number and/or surface area of the protrusons is chosen depending on the demands on flying height, flying speed and the aggressivity necessary or to be limited. At least four protrusions in the border zones of the slider ensure uniform air pressure so that the tendency of tipping can be reduced. The slider can also be of a rectangular shape, although then it is not suitable for both radial and also for transversal suspensions, as is the case for a square or perhaps also circular slider.

The test results for burnishing heads in various designs are given in the following table. For this purpose, hard disk surfaces of a total of twenty different hard disks coming directly from the production line and not tested, i.e. purely statistically selected, were polished with five different heads.

Firstly, the quality of the single hard disks was checked with a 50% glide head (with dimensions of approx. 0.08× 0.63 inches, with a thickness of approx. 0.017 inches), in 50 mil steps (1.27 mm) from the inner to the outer diameter of the hard disk. In each case, the maximum of the arising impact voltages was recorded and the average determined over the whole surface and the four hard disks.

Afterwards, the hard disks were polished with the following heads:

For the hard disks 1 to 4, only those values obtained during the first check via the glide head were compared with values which were obtained by a further testing of the hard disks via the glide head. The improvement arises from the fact that the test procedure on its own already results in a polishing;

Hard disks 5 to 8 were polished with a so-called 100% waffle head (with dimensions of approx. 0.125×0.160 inches with a thickness of approx. 0.17 inches (according to FIG. 2a, 2b, 2c4));

Hard disks 9 to 12 were polished with a burnishing head according to the invention with four protrusions (4 pad head);

Hard disks 13 to 16 were polished with a burnishing head according to the invention with 8 protrusions (8 pad head);

Hard disks 17 to 20 were polished with a burnishing head according to the invention with 13 protrusions (according to FIGS. 3a, 3b, 4a).

Two polishing runs in steps of 5 mil (0.127 mm) were carried out per hard disk and per burnishing head. Speed and load were the same for all heads.

Upon completion of the test runs, the hard disks were again tested in the same way as initially using the glide head.

The effectiveness of the various heads can thus be ascertained by the ratio of the average impact voltage of the still unpolished hard disks to the polished hard disks.

The following results confirm the larger effectiveness of the burnishing heads according to the invention. It can be expected that the observed improvements of hard disks will be far more significant when owing to negative test results the hard disks are re-polished.

RESULTS

| Type of head; percentage surface portion of the protrusions | Initial average impact voltage | Average impact voltage of polished disks | Percentage of improvement |
| --- | --- | --- | --- |
| not polished | 3,65 | 2,42 | 33,70 |
| Waffle-head | 3,62 | 2,05 | 43,37 |
| 4-Pad; 2,37% | 3,16 | 1,88 | 40,51 |
| 8-Pad; 3,55% | 3,44 | 1,85 | 46,22 |
| 13-Pad; 5,77% | 3,35 | 1,71 | 48,95 |

I claim:

1. A flying burnishing head for polishing surfaces of magnetic media carriers when flying over the surface of the magnetic media carrier, the burnishing head comprising:

a slider having a surface that faces the surface of the carrier that is to be polished;

the slider surface including at least four protrusions that protrude outwardly from the slider surface, the sum of the surface areas of the protrusions facing the surface to be polished being no more than approximately 20% of the total surface area of the slider surface.

2. The burnishing head of claim 1, wherein the sum of the surface areas of the protrusions facing the surface to be polished is no more than approximately 10% of the total surface area of the slider surface.

3. The burnishing head of claim 1, wherein the sum of the surface areas of the protrusions facing the surface to be polished is no more than 7% of the total surface area of the slider surface.

4. The burnishing head of claim 1, wherein the protrusions are symmetrically arranged relative to a center of the slider surface.

5. The burnishing head of claim 1, wherein the slider surface has four corners and one of the protrusions is located in each of the four corers.

6. The burnishing head of claim 1, further comprising a suspension, the slider being attached to the suspension.

7. The burnishing head of claim 1, wherein the slider surface is square.

8. The burnishing head of claim 1, wherein the surfaces of the protrusions that face the surface to be polished are approximately square, with corners of the squares facing in a direction in which the slider moves relative to the surface to be polished.

9. The burnishing head of claim 1, wherein sides of the protrusions are parallel to sides of the slider.

10. The burnishing head of claim 1, wherein sides of the protrusions are parallel to each other and offset by approximately 45° relative to sides of the slider.

11. The burnishing head of claim 1, wherein the protrusion are offset relative to each other so that channel-like recesses extend between the protrusions at an angle of approximately 45° to the direction in which the slider moves relative to the surface to be polished.

12. The burnishing head of claim 1, wherein the protrusions have rounded edges.

13. A burnishing head for polishing surfaces of magnetic media carriers, the burnishing head comprising:

a slider having a surface that faces the surface of the carrier that is to be polished;

the slider surface including at least four protrusions that protrude outwardly from the slider surface, the protrusions having rounded edges, the slider surface having four corners with one of the protrusions being located in each of the four corners, the at least four protrusions being symmetrically arranged relative to a center of the slider surface, and the sum of the surface areas of the protrusions facing the surface to be polished being no more than approximately 20% of the total surface area of the slider surface.

14. The burnishing head of claim 13, further comprising additional protrusions in addition to the at least four protrusions, the additional protrusions located more radially inward from sides of the slider surface than the at least four protrusions located in the corners of the slider surface.

15. A method of polishing a surface of a magnetic media carrier, comprising:

positioning a surface of a slider on a flying burnishing head adjacent to the carrier surface that is to be polished, the surface of the slider having at least four protrusions that protrude outwardly from the slider surface toward the carrier surface that is to be polished, the sum of the surface areas of the protrusions facing the surface to be polished being no more than approximately 20% of the total surface area of the slider surface; and moving the carrier surface that is to be polished relative to the slider surface so that surfaces of the protrusions fly over the carrier surface spaced apart from the carrier surface.

16. The method of claim 15, wherein the protrusions have corners, the corners facing in the direction of movement of the carrier surface relative to the slider surface.

17. The method of claim 15, wherein the slider includes channel-like recesses that extend between the protrusions at an angle of approximately 45° to the direction of movement of the carrier surface relative to the slider surface.

18. The method of claim 15, wherein the protrusions have rounded edges.

* * * * *

UNITED STATES PATENT AND TRADEMARK OFFICE
CERTIFICATE OF CORRECTION

PATENT NO.   : 5,782,680
DATED        : July 21, 1998
INVENTOR(S)  : Horatio O. PILSAN It is certified that error appears in the above-indentified patent and that said Letters Patent is hereby corrected as shown below:

On the cover page:
        After "[73]" change "Aijohn" to --Aljohn--.

Signed and Sealed this

Tenth Day of November 1998

Attest:

BRUCE LEHMAN

Attesting Officer     Commissioner of Patents and Trademarks